United States Patent
Calais

(10) Patent No.: US 12,078,311 B2
(45) Date of Patent: Sep. 3, 2024

(54) VEHICLE HEADLAMP HAVING A LIGHTING FUNCTION SITUATED BEHIND A SIGNALLING FUNCTION

(71) Applicant: RENAULT S.A.S, Boulogne Billancourt (FR)

(72) Inventor: Valère Calais, Guyancourt (FR)

(73) Assignee: RENAULT S.A.S, Boulogne Billancourt (FR)

( * ) Notice: Subject to any disclaimer, the term of this patent is extended or adjusted under 35 U.S.C. 154(b) by 0 days.

(21) Appl. No.: 18/257,467

(22) PCT Filed: Dec. 6, 2021

(86) PCT No.: PCT/EP2021/084396
§ 371 (c)(1),
(2) Date: Jun. 14, 2023

(87) PCT Pub. No.: WO2022/128571
PCT Pub. Date: Jun. 23, 2022

(65) Prior Publication Data
US 2024/0027046 A1    Jan. 25, 2024

(30) Foreign Application Priority Data
Dec. 18, 2020    (FR) ...................................... 20 13637

(51) Int. Cl.
*F21S 41/20*    (2018.01)
*F21S 41/24*    (2018.01)
*F21S 41/275*    (2018.01)

(52) U.S. Cl.
CPC ............. *F21S 41/275* (2018.01); *F21S 41/24* (2018.01); *F21S 41/285* (2018.01)

(58) Field of Classification Search
CPC ........ F21S 41/24; F21S 41/285; F21S 43/245; F21S 43/249; F21S 41/275; F21S 41/50;
(Continued)

(56) References Cited

U.S. PATENT DOCUMENTS

| 2004/0130904 A1* | 7/2004 | Yamada | B60Q 1/2607 |
| | | | 362/487 |
| 2004/0136203 A1* | 7/2004 | Gasquet | F21S 43/249 |
| | | | 362/543 |
| 2013/0003397 A1* | 1/2013 | Buisson | F21S 43/245 |
| | | | 362/511 |

FOREIGN PATENT DOCUMENTS

| DE | 19652159 A1 * | 6/1998 | .......... B60Q 1/0011 |
| DE | 102 07 694 A1 | 11/2003 | |

(Continued)

OTHER PUBLICATIONS

DE-19652159-A1 English translation (Year: 1998).*

(Continued)

*Primary Examiner* — Omar Rojas Cadima
(74) *Attorney, Agent, or Firm* — Oblon, McClelland, Maier & Neustadt, L.L.P.

(57) ABSTRACT

A vehicle headlamp includes a housing closed by a transparent outer lens and, inside the housing, a lighting module that emits a light beam in the direction of an optical axis defining a cone of light and a transparent screen that is positioned between the lighting module and the outer lens and receives, in its thickness, a light beam emitted by a light source. An internal face of the screen is provided with optical modules that reflect the light emitted by the light source in the direction of the outer lens. The outer lens forms a first angle of 60 to 100° with the optical axis of the lighting module and the screen forms a second angle such that a part of the cone of light of the light beam that is situated beneath the optical axis is reflected by the screen above the lighting module.

13 Claims, 3 Drawing Sheets

(58) Field of Classification Search
CPC .......... F21S 41/25; F21S 43/239; F21S 43/26;
F21S 43/40; B60Q 1/0058; G02B 6/0036;
G02B 6/0018; G02B 5/08; G02B 6/001;
G02B 6/0038; F21W 2103/10; F21W
2102/00; F21W 2102/135; F21W
2103/00; F21W 2103/20; F21W 2103/35;
F21W 2107/10
See application file for complete search history.

(56) References Cited

FOREIGN PATENT DOCUMENTS

| | | |
|---|---|---|
| EP | 1 835 224 A1 | 9/2007 |
| EP | 2 159 477 B1 | 1/2015 |
| JP | 2012-38424 A | 2/2012 |
| JP | 2012-64535 A | 3/2012 |

OTHER PUBLICATIONS

International Search Report issued Mar. 29, 2022 in PCT/EP2021/084396, filed on Dec. 6, 2021, 2 pages.
French Preliminary Search Report Issued Aug. 16, 2021 in French Application 20 13637 filed on Dec. 18, 2020 (with English Translation of Categories of Cited Documents), 3 pages.

* cited by examiner

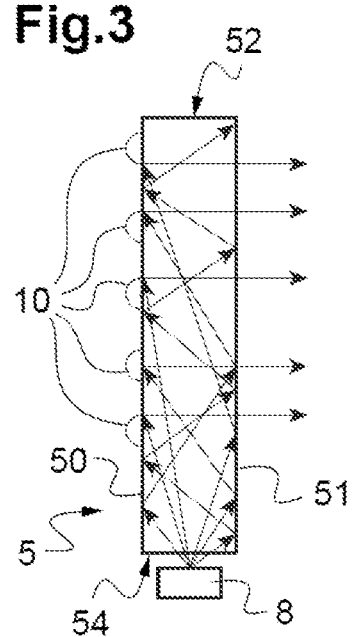
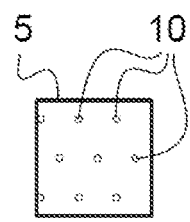

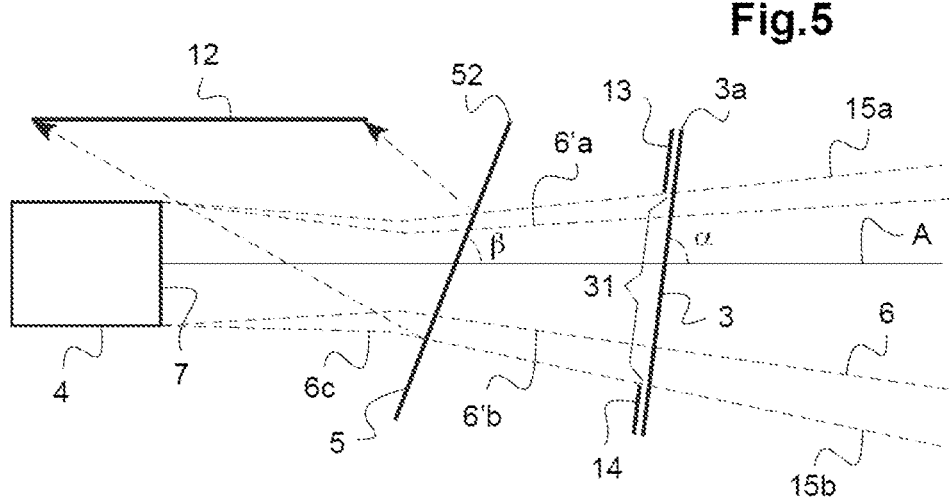
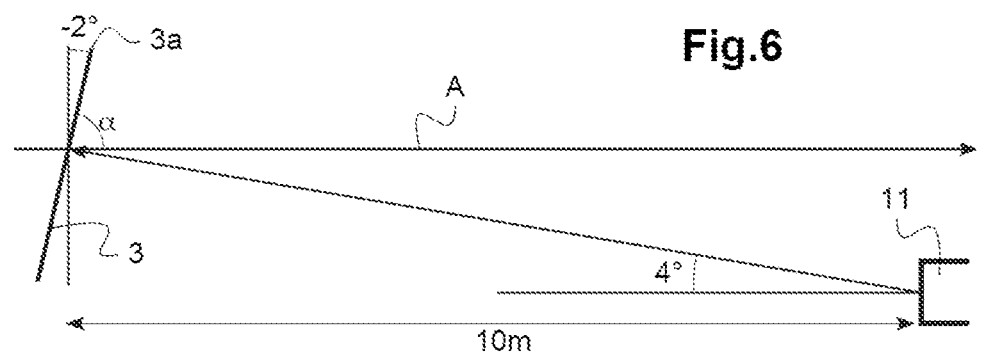
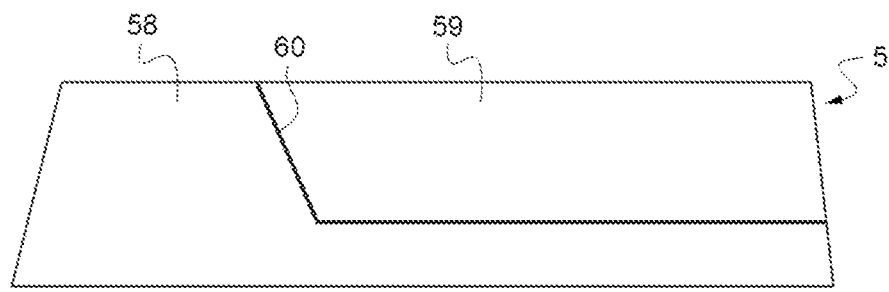

VEHICLE HEADLAMP HAVING A LIGHTING FUNCTION SITUATED BEHIND A SIGNALLING FUNCTION

The invention relates to a vehicle headlamp in which a lighting function is situated behind a signaling function.

Certain motor vehicle headlights provide a lighting function (low and/or high beam) and a signaling function (position lights, flashing turn signals) where the lighting function is placed behind the signaling function. In order to ensure correct operation of the lighting function, a mobile device is provided to move the signaling function out of the way when the lighting function is activated so as to uncover the space in front of the lighting function. However, this solution is relatively complex to implement and is susceptible to faults.

A lighting device comprising a transparent screen situated between the outer lens and a main light source is also known, from document EP1434000, this screen having a face equipped with focal points for the scattering of the light. This arrangement makes it possible to illuminate the entire surface of the outer lens or to create continuous and localized illuminated zones on the outer lens. This screen may also provide a position-light function when it is illuminated via its edges by secondary light sources. Because the screen runs parallel to the outer lens, or even conforms to the shape thereof, an observer stationed in front of the lighting device may nevertheless be able to catch a glimpse of the main light source. Further, the perception of the lighting functions may be disturbed by the screen or by light radiation coming from outside the lighting device.

The invention seeks to overcome all or some of these disadvantages by proposing a headlamp for a vehicle comprising a housing closed by a transparent outer lens, inside which housing there are placed at least one lighting module emitting a beam of light in the direction of an optical axis defining a cone of light and a transparent screen positioned between said at least one lighting module and the outer lens, at least one edge of the screen receiving a beam of light emitted by at least one light source illuminating the screen in its thickness, characterized in that:

an internal face of the screen, which face is situated facing said at least one lighting module, is equipped with a plurality of optical modules that scatter the light emitted by the at least one light source toward the outer lens, the outer lens makes a first angle of 60° to 100°, or even 60° to 90°, with the optical axis of said at least one lighting module, the screen makes, with the optical axis of said at least one lighting module, a second angle such that part of the cone of light from the beam of light, which part is situated beneath the optical axis when the headlamp is in a position of use, optionally a part of the cone of light which part is the furthest from the optical axis, is reflected by the screen toward said lighting module above same.

The position of use of a headlamp will depend upon the vehicle used and upon the regulations in force. For a motor vehicle, the position of use generally corresponds to a position in which the optical axis is horizontal or substantially horizontal.

Through this special arrangement of its various elements, the headlamp according to the invention makes it possible to create a signaling function in front of a lighting function and which is not disturbed by the beams of light coming in from outside the headlamp and is not visible to an observer from outside the headlamp. In particular, the signaling function may be provided by the beam or beams of light emitted by the at least one light source illuminating the screen in its thickness and via the internal face of the screen which reflects this or these beam or beams of light toward the outer lens and the outside of the headlamp. Because the screen is transparent, the most part (at least 75%, or even at least 80%) of the beam or beams of light emitted by the lighting module or modules may pass through it when the lighting function is activated. Further, insofar as the screen reflects a portion of the beam or beams of light to above the lighting module or modules, the screen causes little disturbance to the lighting function. Advantageously, the screen may have an internal face and an opposite external face which are parallel. In particular, the optical modules may be configured in such a way as to reflect the light emitted by the at least one source perpendicular to the external face.

Advantageously, when the headlamp comprises at least two lighting modules, the second angle may be such that, for the lighting module that emits the largest cone of light, that part of the cone of light of the beam of light from this module which part is situated beneath the optical axis when the headlamp is in the position of use, notably that part of the cone of light that is furthest from the optical axis, is reflected by the screen toward said lighting module, above same. This makes it possible to reduce disturbance of the lighting function by the screen still further. Advantageously, the headlamp may comprise, inside the housing, a light-absorbing element placed in a part of the housing that is situated above the optical axis in the position of use of the headlamp, notably above the cone of light, this absorbing element extending over a sufficient surface area to receive that part of the cone of light from the beam of light which part is emitted by said at least one lighting module and reflected by the screen. In other words, the surface area of the absorber is at least equal to a surface area of the intersection of the absorber element with that part of the cone of light that is emitted by said at least one lighting module and reflected by the screen. This makes it possible to reduce the disturbance of the lighting function by the screen still further. In particular, this light-absorbing element may form part of the housing or be fixed to the inside of the housing. It may be a surface in a dark color, preferably as dark as possible, or even black, with a matt appearance, possibly having roughnesses that eliminate or reduce specular reflection.

Advantageously, at least an upper part of a contour of a transparent zone of the outer lens, notably a part that is situated above the optical axis when the headlamp is in the position of use, is defined by a curve of intersection of the outer lens with the cone of light from at least one lighting module, notably with the largest cone of light when at least two lighting modules are present, or by a curve situated outside of the curve of intersection at a determined distance therefrom. This makes it possible to limit the contour of a transparent zone of this lens, or in other words limit the surface area of the outer lens, improving the aesthetic rendering of the lighting functions and reducing external reflections. This transparent zone may represent part of the surface of the outer lens or the entirety thereof.

Usually, the headlamp may comprise two or more lighting modules. In that case, these may advantageously be placed one beside the other horizontally, the headlamp being in the position of use, thereby making it possible to simplify the production of the headlamp notably by comparison with a position whereby the lighting modules are positioned one above the other, which may entail the addition of horizontal partitions between the modules in order to isolate them.

In certain instances, the at least one lighting module may emit a cone of light that has a narrowing. The cone of light may then exhibit, starting from the lighting module, a first part that converges as far as the narrowing, followed by a divergent second part. In that case, the outer lens may advantageously be placed at the narrowing of the cone of light along the optical axis. This makes it possible to create a transparent zone that is as small as possible and therefore have fewer rays of light from outside entering the headlamp, thus yielding an appearance that is more compact in the height-wise direction.

The optical modules on the screen may scatter a portion of the beams of light received by the screen and disturb the lighting function resulting from activation of the lighting module. This scattering will be all the greater if the illumination from a lighting module is intense and if the surface density of the optical modules is great. In order to reduce this scattering, the screen may have at least a first illuminated zone that receives from said at least one lighting module a first intensity of light, and at least a second illuminated zone that receives from said at least one lighting module a second intensity of light lower than the first intensity of light. It is then possible to choose a surface density of optical modules in said at least one first illuminated zone that is lower than the surface density of said optical modules in said at least one second illuminated zone.

Advantageously, at least one light source may be placed on at least one edge of the screen emitting a beam of light into the screen and/or at least one light guide may extend along at least one edge of the screen, the at least one source of light being placed at one end of the light guide and emitting a beam of light into the light guide.

The screen may finally be used to define various lighting zones and thus create luminous shapes and/or animations. To this end, the screen may receive at least two beams of light from at least two distinct light sources, notably controlled separately, and the screen may be divided into at least two zones each receiving one of the beams of light, each zone being separated from another zone by an opaque material that blocks the beams of light.

Advantageously, the outer lens may be made from a tinted transparent material.

The invention is now described with reference to the attached nonlimiting drawings in which:

FIG. 3 depicts a schematic view in profile of a screen of the headlamp according to one embodiment.

FIG. 4 partially depicts a face-on view of the optical modules situated at the surface of the screen according to one embodiment, here with optical modules of conical type.

FIG. 5 schematically depicts a lighting module, its cone of light and the positioning of the screen, of the outer lens and of an absorbing element according to one embodiment.

FIG. 6 schematically depicts the inclination of an outer lens as a function of a headlamp from outside.

FIG. 7 is a schematic face-on depiction of a screen according to one embodiment of the invention.

In the present description, the terms front, rear, upper, lower, above, below refer to the directions of the vehicle, the headlamp being mounted on the vehicle (in a position of use). The axes X, Y, Z correspond respectively to the longitudinal axis (from front to rear), transverse axis and vertical axis of the vehicle, the latter resting on the ground. The vertical direction thus corresponds to the direction of gravity.

What is meant by substantially horizontal, longitudinal or vertical is a direction/a plane that makes an angle of at most ±20°, or even of at most ±10° or of at most ±5°, with a horizontal, longitudinal or vertical direction/plane.

Figure 1:
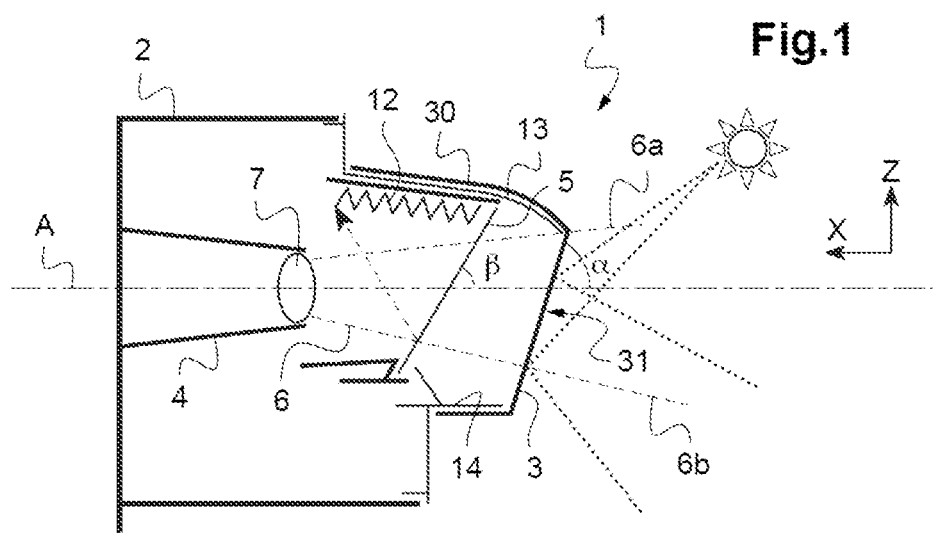
FIG. 1 is a schematic depiction in cross section of a headlamp according to one embodiment.

FIG. 1 depicts a headlamp 1 comprising a housing 2 closed by a transparent outer lens 3. The outer lens 3 is made of a transparent plastics material (for example of polymethyl methacrylate (PMMA) or polycarbonate) and may be tinted to make the inside of the headlamp less visible. This tint may increase the absorption of the material used to make the outer lens by at most 20% compared with the same material untinted. The housing 2 contains within it at least one lighting module 4 and a transparent screen 5.

Just one single lighting module 4 is depicted in the figures but two or more lighting modules may advantageously be provided, for example one lighting module performing a lighting function of the high-beam type and one lighting module providing a lighting function of the low-beam type. In that case, it is preferable for the lighting modules to be placed side by side horizontally. The optical axes of each lighting module typically exhibit an angular deviation of 0 to 5° vertically and of 0 to 20° horizontally.

Use may be made of any type of lighting module, notably having a (filament or discharge) bulb, or using light-emitting diodes (LEDs) or LASER light, with or without lightguide. However, modules employing LEDs are preferred. These light sources are used with an optical system of the reflector type or of the projection type, with or without a lens. These various types of modules are well known and will not be described further in detail.

The lighting module 4 emits a beam of light in the direction of an optical axis A defining a cone of light 6. The cone of light corresponds to the beam of the divergent rays of light exiting the lighting module 4. This may notably be a surface defined by the useful rays of light that have diverged the furthest from the optical axis. These useful rays of light may be defined as being the rays of light for which the degree of illumination is equal to a determined value for the maximum illumination of the rays of light of the module. This value may be dictated by regulations, and may usually be comprised between 0 and 1250 Cd. In practice, this cone is formed from a succession of curves extending in planes orthogonal to the optical axis, each curve being defined by the intersection of the useful rays of light furthest from the optical axis with a plane orthogonal to the optical axis. By convention, the image of the pupil 7 of the lighting module, projected if need be onto the last optical surface of the lighting module, will be taken as origin curve. This pupil 7 is therefore often the reflector or an exit lens of a lighting module. FIG. 1 depicts the headlamp 1 in its position of use mounted on the vehicle, with the optical axis A extending horizontally or substantially horizontally.

The shape of the cone of light 6 is generally directed by regulations, as is the required photometry for each type of function (high beam, low beam, etc.) and each lighting module will be selected accordingly. For example, the following situations may arise:

Lighting module performing only a low-beam function, in a vertical plane containing the optical axis, the cone of light forms an angle from +2° to −10° relative to the optical axis, discounting adjustment margins (the positive angles corresponding to those parts of the cone that are above the optical axis and the negative angles to those parts of the cone that are below the optical axis), Lighting module performing only a high-beam function, in a vertical plane containing the optical axis, the cone of light forms an angle from +10° to −3° relative to the optical axis, discounting adjustment margins, Lighting module performing both high-beam and low-beam functions, in a vertical plane containing the optical axis, the cone of light forms an angle from +10° to −10° relative to the optical axis, discounting adjustment margins.

Furthermore, the cone of light 6 may have a simple conical shape, the upper and lower limits of which are designated by the references 6a and 6b respectively, as depicted in FIG. 1, or a complex shape having, starting from the lighting module, a form that converges as far as a narrowing 6c followed by a divergent shape, this cone having upper and lower limits designated by the references 6'a and 6'b respectively in FIG. 5.

In the example depicted, the screen 5 is made of a transparent plastics material, for example a PMMA or a polycarbonate. Its thickness may be from 2 to 5 mm, notably to make it easy to manufacture using injection molding. Its color may be colorless.

The screen 5 has two main opposite faces 50, 51, namely faces with larger dimensions than the other faces, and which are preferably parallel, one of them, 50, being an internal face situated facing the lighting module 4 and the other one, 51, being an external face situated on the side of the outer lens 3. The screen 5 further exhibits edges (or edge faces) 52-55 of which at least one receives a beam of light emitted by one or more light sources 8 illuminating the screen in its thickness. More generally, the light source or sources 8 are of LED type, with or without a collimator.

Figure 2:
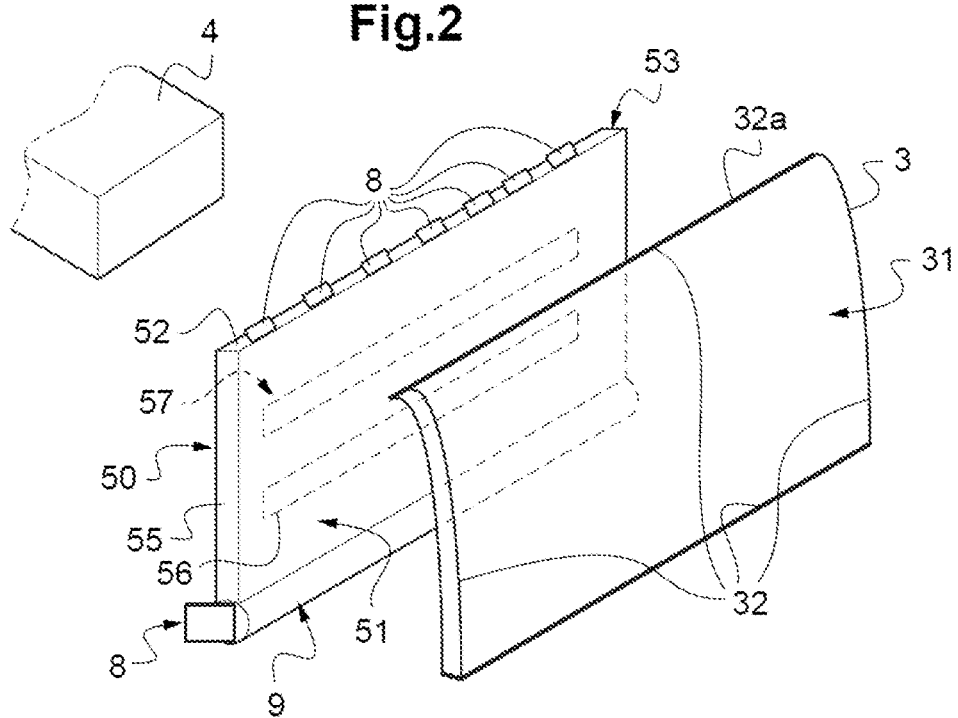
FIG. 2 is a schematic depiction in perspective of the lighting module, of a screen and of an outer lens of a headlamp according to one embodiment.

In FIG. 2, two opposite edges 52, 54 of the screen are thus illuminated, the upper edge 52 being illustrated by a series of light sources 8 and the lower edge 54 being illuminated by a single light source situated at one end of a light guide 9 extending along the lower edge 54. This light guide 9 in this instance is a cylindrical guide. However, the invention is not restricted to a particular shape of light guide 9 provided that it is able to scatter the light into the thickness of the screen. Such a light guide is therefore also formed from a transparent plastics material, for example those mentioned above.

In order to perform a lighting, in this instance signaling, function, the internal face of the screen 5 is provided with a plurality of optical modules 10 that scatter the light emitted by the light sources 8 in the direction of the outer lens, this light exiting via the external face 51. The optical modules 10, also known as micro-optics, are surface alterations to the internal face of the screen, of the bosses or dimples type, that locally modify the relief of this face. These optical modules may be formed by surface treatment (laser treatment or mechanical abrasion treatment) or more frequently during part of the process of creating the screen by molding. These optical modules 10 have the prime function of extracting the light emitted by the light source or sources 8 out of the screen via the external face 51 by reflecting toward the outside of the screen any rays of light that are likely to spread within the thickness of the screen and that are emitted by the light source or sources 8. The screen 5 thus acts as a surface optical guide, also known as a light curtain, the rays of light entering its thickness via its edges and spreading through a succession of total internal reflections and exiting via the external face opposite to the face provided with the optical modules. When at least some of these rays of light strike the optical modules 10, the rays are reflected, at least in part, in a direction transverse to the external face and preferably perpendicular thereto. To an observer, it is entirely as if these optical modules were themselves light sources. As a preference, each of the optical modules 10 is configured to reflect the light perpendicular to the external face, thus encouraging the ray of light to exit, as depicted in FIG. 3.

The outer lens 3 of the headlamp forms an angle alpha (α) of 60° to 90°, or even of 70° to 90°, with the optical axis of the lighting module 4 in the position of use of the headlamp, as depicted schematically in FIGS. 1, 5 and 7. In other words, the outer lens may be vertical or inclined, its upper edge 3a, more specifically the upper edge 32a of the transparent zone 31 thereof, being directed toward the ground, on an opposite side to the lighting module. A vertical-to-inclined position allows the radiation from the sun or other illumination to be directed predominantly toward the ground, as indicated schematically in FIG. 1, an inclination from 60° to 89°, or even from 60° to 88°, encourages the reflecting of external illumination toward the ground. However, it is possible for the outer lens 3 to make an angle alpha from 90° to 100° with the optical axis of the module (its upper edge is then directed toward the ground but on the side of the lighting module), as this would still enable radiation from the sun or other lighting to be directed predominantly toward the ground, particularly if the angle they make relative to the optical axis of the lighting module is greater than 20°.

This angle of inclination may be determined according to the type of external lighting that is to be reflected toward the ground. For example, considering a vehicle finding itself face to face with a headlamp 11 mounted slightly lower down than the headlamp of the invention (1.1 m versus 0.4 m, or in other words with the optical axis of the headlamp 11 situated 70 cm below the optical axis A), as depicted in FIG. 6, at a distance of 10 m and with the rays at an upward angle of 4°, an angle α of 88° will be chosen so that the rays are reflected parallel to the optical axis A or toward the ground.

Moreover, the screen 5 forms an angle beta (β) with the optical axis such that, in the position of use of the headlamp, a part 6b, 6'b of the emission cone of the beam of light which part is situated below the optical axis is reflected by the screen 5 toward said lighting module, above same, as depicted schematically in FIGS. 1 and 5. The upper edge 52 of the screen is thus inclined in the direction of the optical axis. In the example depicted, this inclination is such that a ray of light spreading along the lower limit 6b, 6'b of the cone of light, namely along a part of the emission cone which part is furthest from the optical axis, is reflected by the screen above the lighting module 4. This inclination of the screen also makes it possible to limit or prevent external rays of light coming from the outer lens passing through the screen and reaching the optical module 4. If several lighting modules 4 are provided, then the angle β is determined in such a way that, for the lighting module that emits the largest cone of light, that part of the emission cone for the beam of light which part is situated below the optical axis in the position of use of the headlight is reflected by the screen toward said lighting module, above same.

Furthermore, a light-absorbing element 12 may be placed in an upper part of the housing 2, as depicted in FIGS. 1 and 5, and this absorbing element may be dimensioned so that it extends over a sufficient surface area to receive a portion of the beam of light which portion is emitted by the lighting module and reflected by the screen. Thus, when the lighting module 4 is in operation, the screen directs reflections from this module toward the absorbing element 12, maintaining a dark effect inside the headlamp and preventing emitted light from returning to the lighting module through specular reflection. Furthermore, because this absorbing element 12 is situated below an upper part of the housing, it remains invisible to an external observer (pedestrian). The surface of the absorbing element 12 that receives the rays of light from the lighting module and reflected by the screen may be a surface with a dark color, preferably as dark as possible, or even black, with a mat appearance, possibly having roughnesses that eliminate or reduce specular reflection. These roughnesses may be produced by graining or may form a baffle or a series of indentations with corner angles greater than 45°. If its surface is liable to reflect part of the received beam of light, the absorbing element 12 may be arranged in such a way as to direct the reflected rays toward a zone of the headlamp that is not visible to an external observer. The absorbing element 12 may be produced as one piece with the housing or may form part of an internal lining of the housing, fixed to the housing.

In the example depicted in FIG. 1, the outer lens 3 has a part 30 extending partly above the absorbing element 12: provision may be made for an interior face of this part 30 to be rendered opaque so as to prevent external rays of light from entering the housing, notably outside of a transparent zone 31 of the surface of the outer lens, this transparent zone being dedicated to the lighting/signaling functions. In particular, the interior face of this part 30 may be rendered opaque by a lining piece 13 of dark or even black color, preferably mat. In particular, this transparent zone 31 may be delimited by a contour 32 defined either by a curve of intersection of the outer lens with the cone of light of the lighting module, notably with the largest cone of light when two or more lighting modules are present, or by a curve situated outside the curve of intersection at a determined distance therefrom. This latter solution will be preferred because it makes it possible to provide a margin corresponding to the lighting module adjustment margins, the distance separating the contour from the curve of intersection corresponding to this margin. In FIG. 5, it is possible to see the upper 15a and lower 15b limits of a cone corresponding to the cone of light 6, with the lighting module adjusting margins added to them. This makes it possible to limit the dimensions of the transparent zone 31 and thus reduce the risk of external rays entering the housing via this transparent zone. Furthermore, since these external rays usually come from above the headlamp (sunlight, public lighting), it may be sufficient to delimit an upper part of the transparent zone 31, situated above the optical axis using the contour 32 as described previously. Notably it may be possible to choose a lighting module having a cone of light of which the height (measured vertically in the position of use) is as small as possible (for example less than 130 mm or even less than 50 mm), for example by choosing a lighting module that has the smallest possible pupil, this being so as to reduce as far as possible the surface area of the transparent zone 31 of the outer lens, at least in the upper part, and hence the reflections caused by external lighting.

In the example of FIG. 1, the transparent zone 31 of the outer lens represents just part of the surface of the outer lens 3, the rest of the surface being rendered opaque by one or more linings 13, 14. However, it would be possible to envision the surface area of the outer lens being equal to the surface area of the transparent zone.

In the example depicted in FIG. 5, the lighting module 4 emits a cone of light 6 having a narrowing, as described above. The outer lens may therefore be positioned as depicted in FIG. 5. However, the outer lens 3 will preferably be positioned at the narrowing of the cone of light along the optical axis (in the direction of emission of the light) so as to have the smallest possible input of light in order to increase the dark internal effect and with a view to giving a vertically more compact appearance.

A lighting module 4 may advantageously be selected for which the narrowing 6c is as distant as possible from the lighting module so that the screen can be housed inside the housing without appreciably increasing the dimension of the housing in the direction of the optical axis, thereby increasing the dark appearance and thus reducing the visibility of the lighting module to an observer. When the lighting module 4 is in operation, the optical modules of the screen may modify the beam of light. In particular, a high surface density of optical modules in a zone of high light intensity may increase the dazzling of an external observer through scattering. In order to limit these modifications, the optical modules 10 may be distributed differently over the surface of the screen according to the intensities of light emitted by the lighting module and received by the screen. Thus there may be defined a first illuminated zone 56 of the screen that receives from the lighting module a first intensity of light and a second illuminated zone 57 that receives from the lighting module a second intensity of light that is lower than the first intensity of light. It is therefore possible to choose a surface density for the optical modules in the first illuminated zone that is lower than the surface density of said optical modules in the second illuminated zone. Typically, in this first zone, the optical modules may cover from 0 to 20% of the surface area of the first zone for a spacing of 0.15 mm between optical modules, or may cover from 0 to 35% of the surface area of the first zone for a spacing of 0.5 mm between optical modules. As far as the second zone is concerned, this may have no optical modules or the optical modules may cover a proportion of the surface area of the second zone that is lower than the aforementioned percentages for the first zone. However, when optical modules are present in this second zone, particularly in order to create an illuminated pattern with the light source or sources of the screen or in order to perform a signaling function, the optical modules may cover a proportion of the surface area of the second zone that is greater than the abovementioned percentages for the first zone, or even almost all of the surface area of the second zone. The surface densities of the different zones may be chosen according to the rendering of light desired. Typically, depending on the zones of the screen, for a spacing of 0.1 mm to 1 mm between optical modules, the optical modules may thus cover from 0 to 99% of the surface area of the screen zone concerned. The shape and dimensions of these first and second zones 56, 57, as depicted schematically in FIG. 2, will preferably be determined to take account of the lighting module adjustment margins. The distribution of the optical modules 10 over the internal face 50 of the screen will preferably be uniform whatever the zone, as depicted schematically in FIG. 4, with a surface density that differs from one zone to the other. By way of example, in a zone that receives intense lighting, for example that receives more than 10,000 candelas, the optical modules 10 may cover 35% or less, or even 20% or less of the surface area of the zone; and in a zone that receives weak lighting, for example that receives less than 10,000 candelas, the optical modules 10 may cover from 0% to 99% of the surface area of the zone.

Of course, the invention is not restricted by the shape and number of first and second screen zones.

Provision may further be made for the screen 5 to be divided into zones 58, 59 which are separated by an opaque material 60, in this instance in strip form, that blocks the rays of light, as depicted in FIG. 7. By using distinct light sources to illuminate each of these zones of the screen, it is possible to create different luminous shapes. Further, distinct control of the lighting sources will allow each zone 58, 59 to be illuminated independently, for example in order to create different signaling functions (flashing/any other regulatory signaling function, or position/flashing indicator) functions. This opaque material will preferably be applied outside of a screen zone that receives a high intensity of light from the lighting module. These two zones 58, 59 may be obtained by producing the screen in two parts assembled with one another and by applying a layer of opaque material between the two assembled parts, or during the process of producing the screen by injection molding by providing a step of injecting the opaque material between the two zones.

The headlamp according to the invention may be a headlamp for the front of a motor vehicle or for any other vehicle equipped with a headlamp.

The invention claimed is:

1. A headlamp for a vehicle comprising:
    a housing closed by a transparent outer lens, inside which housing there are placed at least one lighting module emitting a beam of light in the direction of an optical axis defining a cone of light and a transparent screen positioned between said at least one lighting module and the outer lens, at least one edge of the screen receiving a beam of light emitted by at least one light source illuminating the screen in its thickness, wherein:
    an internal face of the screen, which face is situated facing said at least one lighting module, is equipped with a plurality of optical modules that scatter the light emitted by the at least one light source toward the outer lens,
    the outer lens makes a first angle of 60° to 100° with the optical axis of said at least one lighting module,
    the screen makes, with the optical axis of said at least one lighting module, a second angle such that part of the cone of light from the beam of light, which part is situated beneath the optical axis when the headlamp is in a position of use, is reflected by the screen toward said lighting module and above said lighting module.

2. The headlamp as claimed in claim 1, wherein the headlamp comprises at least two lighting modules and the second angle is such that, for the lighting module that emits a largest cone of light, that part of the emission cone of the beam of light from this module, which part is situated beneath the optical axis when the headlamp is in the position of use, is reflected by the screen toward said lighting module, and above said lighting module.

3. The headlamp as claimed in claim 1, wherein the headlamp comprises, inside the housing, a light-absorbing element placed in a part of the housing that is situated above the optical axis when the headlamp is in the position of use, this absorbing element extending over a sufficient surface area to receive that part of the cone of light from the beam of light which part is emitted by said at least one lighting module and reflected by the screen.

4. The headlamp as claimed in claim 1, wherein at least an upper part of a contour of a transparent zone of the outer lens is defined by a curve of intersection of the outer lens with the cone of light from at least one lighting module or by a curve situated outside of the curve of intersection at a determined distance therefrom.

5. The headlamp as claimed in claim 1, wherein the headlamp comprises at least two lighting modules placed one beside the other horizontally, the headlamp being in the position of use.

6. The headlamp as claimed in claim 1, wherein the at least one lighting module emits a cone of light that has a narrowing and in that the outer lens is placed at the narrowing of the cone of light along the optical axis.

7. The headlamp as claimed in claim 1, wherein the screen has at least a first illuminated zone that receives from said at least one lighting module a first intensity of light, and at least a second illuminated zone that receives from said at least one lighting module a second intensity of light lower than the first intensity of light and in that a surface density of optical modules in said at least one first illuminated zone is lower than the surface density of said optical modules in said at least one second illuminated zone.

8. The headlamp as claimed in claim 1, wherein the headlamp comprises at least one of the following features:
    at least one light source is placed on at least one edge of the screen and emits a beam of light into the screen,
    at least one light guide extends along at least one edge of the screen and the at least one light source is placed at one end of the light guide and emits a beam of light into the light guide.

9. The headlamp as claimed in claim 1, wherein the screen receives at least two beams of light from at least two distinct light sources and in that the screen is divided into at least two zones each receiving one of the beams of light, each zone being separated from another zone by an opaque material that blocks the beams of light.

10. The headlamp as claimed in claim 9, wherein the at least two beams of light from the at least two distinct light sources received by the screen are controlled separately.

11. The headlamp as claimed in claim 1, wherein the outer lens is made from a tinted transparent material.

12. The headlamp as claimed in claim 1, wherein the part of the cone that is situated beneath the optical axis when the headlamp is in a position of use is a part of the cone of light that is the furthest from the optical axis.

13. The headlamp as claimed in claim 1, wherein at least an upper part of the contour of a transparent zone of the outer lens is defined by the curve of intersection of the outer lens with a largest cone of light when at least two lighting modules are present.

* * * * *